United States Patent [19]

Lammerant et al.

[11] Patent Number: 5,244,085
[45] Date of Patent: Sep. 14, 1993

[54] CASING FOR AT LEAST ONE HIGH DENSITY DATA DISK

[75] Inventors: Henri Lammerant; Filip Lammerant, both of Thulin, Belgium

[73] Assignee: Cartonneries De Thulin, Thulin, Belgium

[21] Appl. No.: 864,634

[22] Filed: Apr. 7, 1992

[30] Foreign Application Priority Data

May 23, 1991 [BE] Belgium .............................. 9100496
Sep. 6, 1991 [BE] Belgium .............................. 9100832
Feb. 17, 1992 [EP] European Pat. Off. ........ 92870028.5

[51] Int. Cl.$^5$ .......................................... B65D 85/57
[52] U.S. Cl. .................................... 206/310; 206/309
[58] Field of Search ................ 206/303, 307, 309–313, 206/387, 444, 493

[56] References Cited

U.S. PATENT DOCUMENTS

| | | | |
|---|---|---|---|
| 4,535,888 | 8/1985 | Nusselder | 206/444 |
| 4,702,369 | 10/1987 | Philosophe | 206/312 |
| 4,805,770 | 2/1989 | Grobecker et al. | 206/309 |
| 4,903,829 | 2/1990 | Clemens | 206/310 |
| 4,993,552 | 2/1991 | Bugbey et al. | 206/309 |

FOREIGN PATENT DOCUMENTS

| | | |
|---|---|---|
| 0114631 | 8/1984 | European Pat. Off. . |
| 0188663 | 7/1986 | European Pat. Off. . |
| 0212377 | 3/1987 | European Pat. Off. ............ 206/307 |
| 0221749 | 5/1987 | European Pat. Off. . |
| 0252226 | 1/1988 | European Pat. Off. . |
| 0272042 | 6/1988 | European Pat. Off. . |
| 0420350 | 4/1991 | European Pat. Off. . |
| 3414903 | 10/1985 | Fed. Rep. of Germany . |
| 8523194 | 11/1985 | Fed. Rep. of Germany . |
| 8906570 | 12/1989 | Fed. Rep. of Germany . |
| 2243145 | 10/1991 | United Kingdom ................ 206/310 |
| 9002403 | 3/1990 | World Int. Prop. O. . |
| 9015411 | 12/1990 | World Int. Prop. O. . |

OTHER PUBLICATIONS

IBM Technical Disclosure Bulletin vol. 17, No. 12, May 1975.
Search Report for priority appln. BE 9100832.
Search Report—BE 9100496.

Primary Examiner—Jimmy G. Foster
Attorney, Agent, or Firm—Tarolli, Sundheim & Covell

[57] ABSTRACT

Casing for one to six compact disks, comprising a base (10), a disk-holder tray (12, 63) and a pivoting device, the tray (12, 63) being able to open through 180°. The disk-holder tray (12, 63) comprises a rectangular plate (35) having lateral protrusions (36) carrying strengthening ribs (41). The protrusions (36) and ribs (41) are capable of engaging in recesses (17, 27, 86) formed in the lateral walls (14, 26, 82) of the base (10) and of the pivoting device. The configuration of the trays (12, 63) allows them to be stacked in an automated manner. Original configurations of the disk holding system.

26 Claims, 7 Drawing Sheets

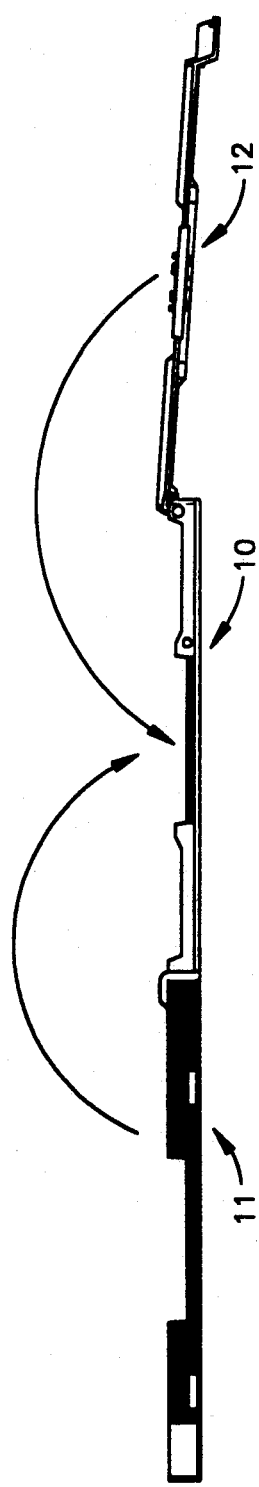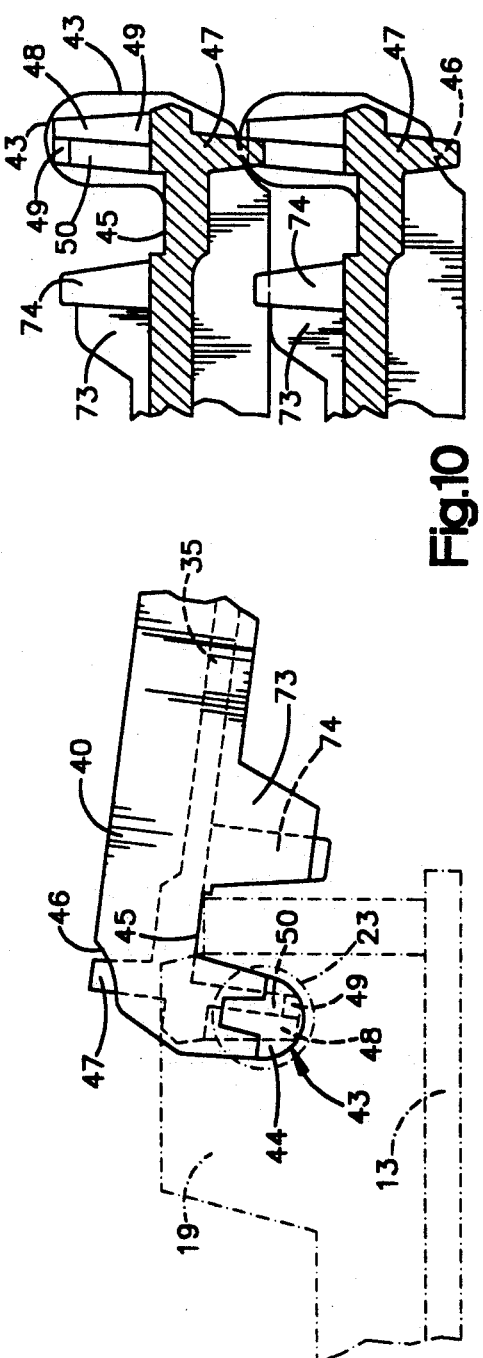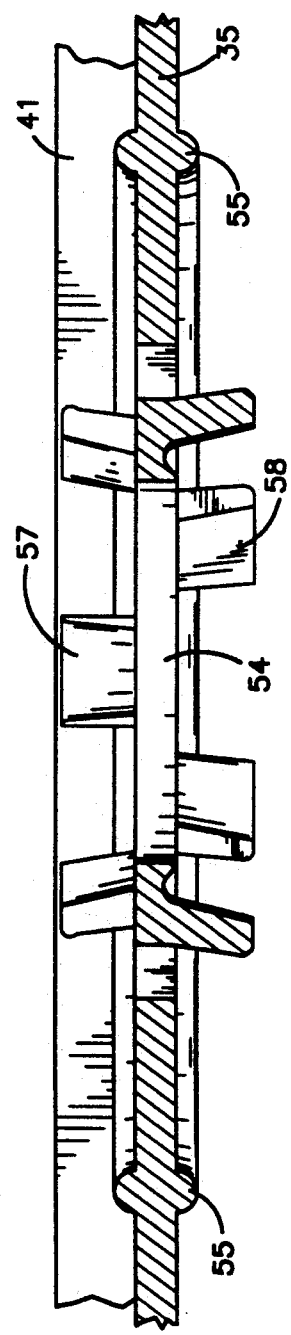

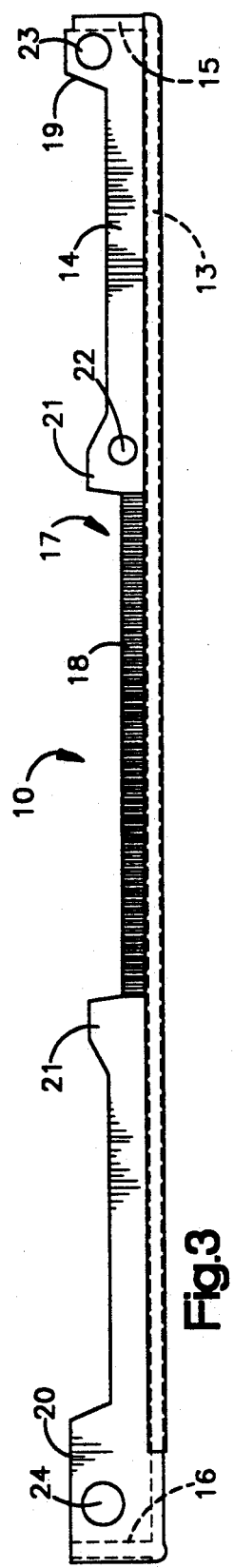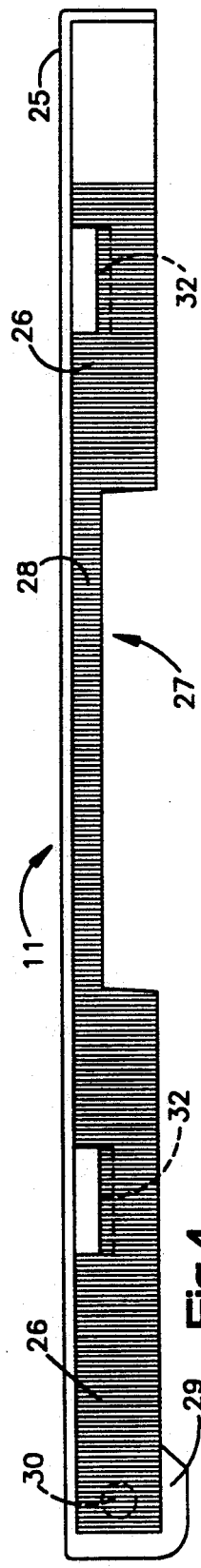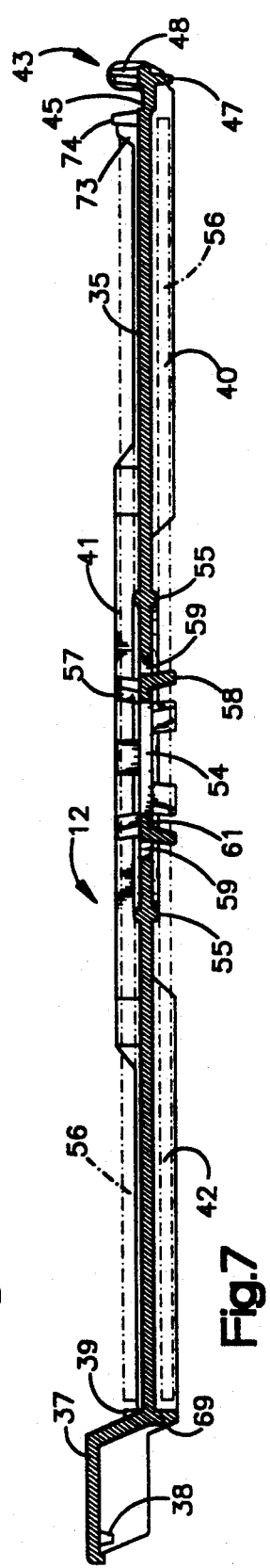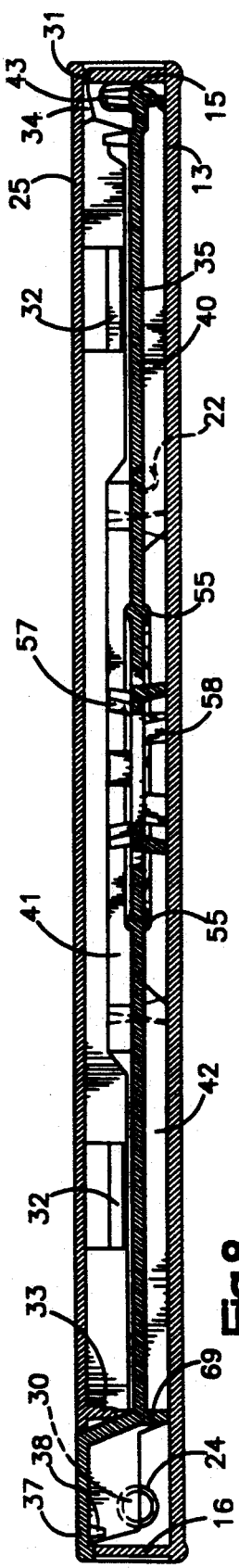

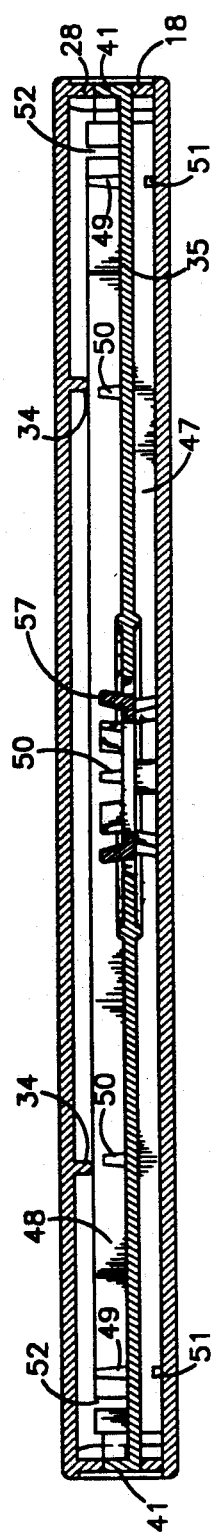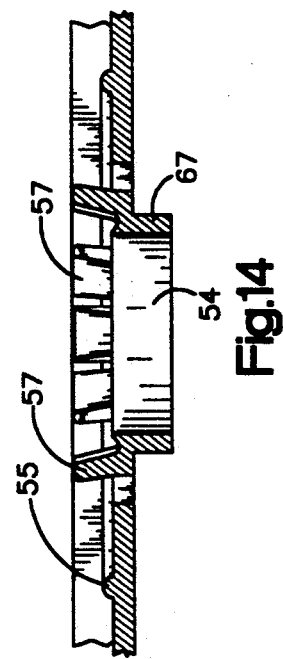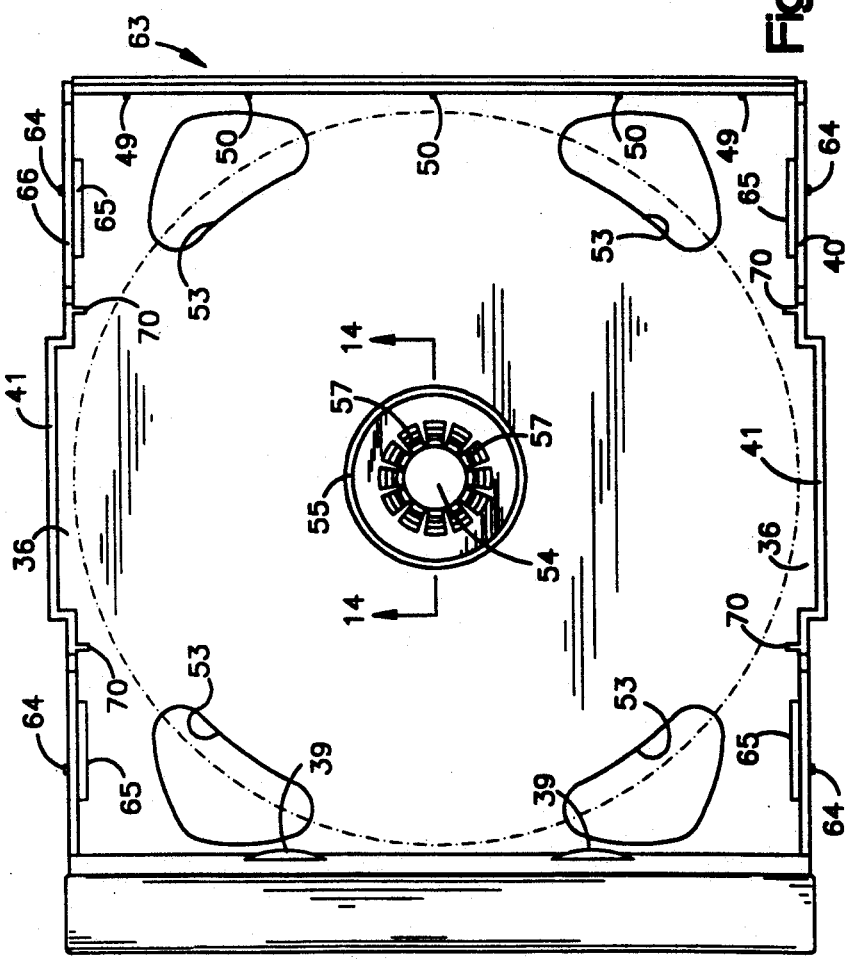
Fig.12
Fig.14
Fig.13

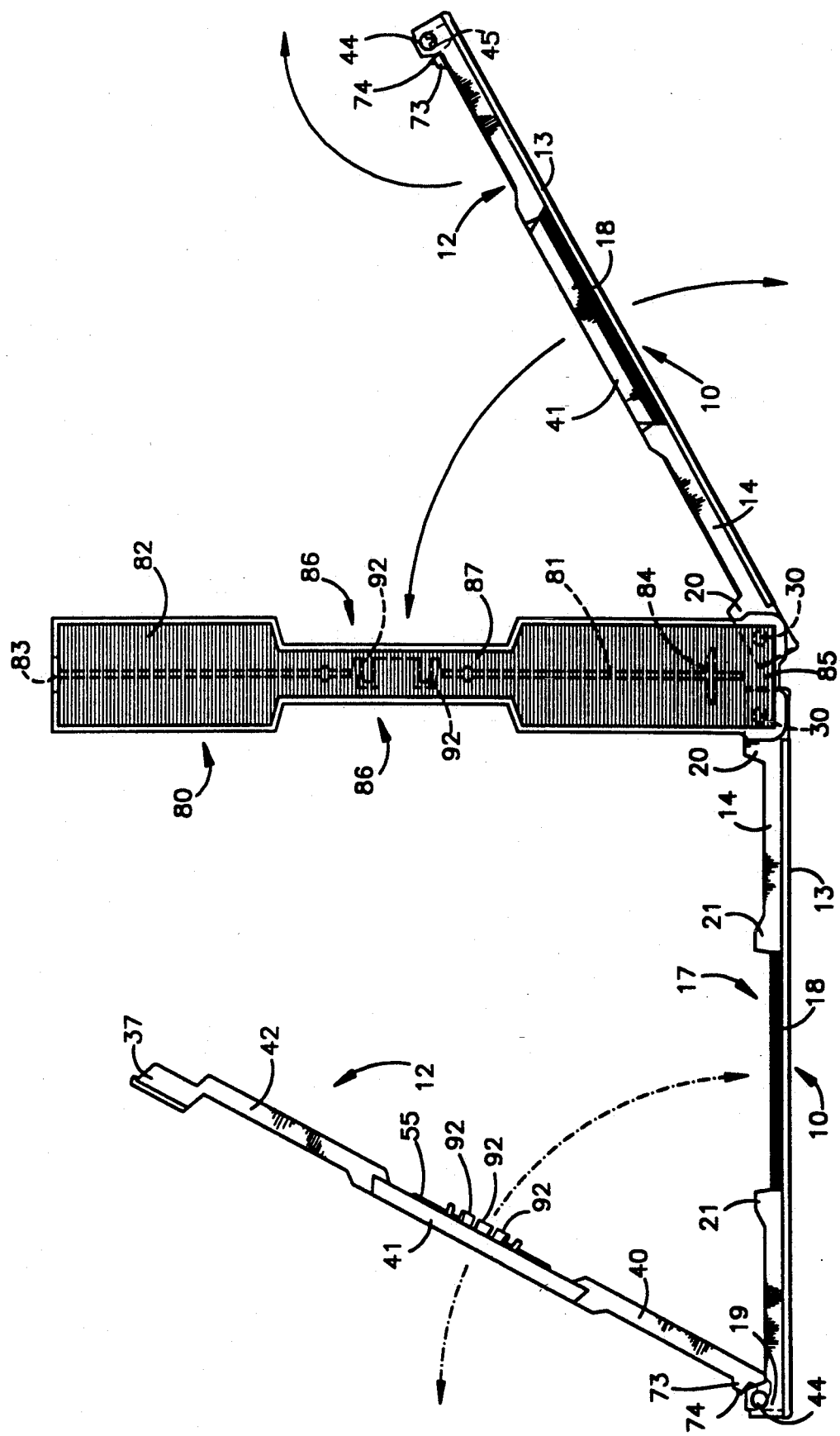

CASING FOR AT LEAST ONE HIGH DENSITY DATA DISK

FIELD OF THE INVENTION

The present invention relates to a storage casing for a data medium in the form of a disk with high recording density, more particularly for the storage of digital audio disks known as compact disks, abbreviated "CD".

BACKGROUND OF THE INVENTION

The rectangular cassette for the storage of a compact disk is known, this cassette being constituted from a case formed from a base, a cover, made from plastic material which is usually transparent, and a disk-holder which is inserted and clamped in the base and which is made from a plastic material which is usually dark.

The base of the case comprises a flat rectangular bottom and four walls. The two lateral walls have a cutout in the middle in order to avoid friction between the disk and the wall and in order to facilitate the grasping, positioning or extraction of this disk. Between the base and the disk-holder it is possible to insert an illustrated title sheet referring to the disk. This sheet extends along the front and rear walls to allow the title also to be read on the edges of the cassette once stored.

The cover comprises an upper rectangular wall, almost square, slightly shorter than the base. Two lateral walls rise from this wall and extend towards the rear, forming flexible arms fitted with spindles which engage in corresponding holes at the rear of the base and which form a pivoting axis for the cover with respect to the base. This allows the cover to be closed or opened through 180°.

The lateral walls of the cover comprise six small inward-facing semicircular extensions (three per side) leaving a certain clearance between them and the upper wall of the cover which allows a booklet with an illustrated cover page relating to the disk to be slid along this wall and to be held there. At the rear, the booklet abuts against a rear wall having the thickness of the booklet. At the front the booklet is stopped by two small protuberances.

The side walls of the base are recessed by the thickness of the lateral walls of the cover. Thus, when the case is closed, the latter are positioned on the edges of the bottom of the base and enclose the lateral walls of the base inside them. At the same time, the cover, having no front wall, rests on the edge of the front wall of the base.

The disk-holder which is also rectangular comprises, along its rear edge, a raised strip which, when the casing is closed, is disposed in the same plane as the upper wall of the cover. The disk-holder comprises raised areas at the four corners and a circular housing at a lower level. The surface of this housing is provided for protecting the disk. At the centre, there is hole corresponding to the central hole of the disk. Concentric with this hole there is a small slightly raised disk which constitutes a bearing surface for the inner circular area of the disk which does not carry data. In this way, the entire area containing data floats freely in the circular housing of the disk-holder, avoiding any contact or friction between the recordings of the disk and the package. Around the central hole there are cut-out segments comprising hooks which hold the edge of the hole of the disk with a pawl effect.

Despite the high density of data recorded on digital audio disks, which allows a playing time of more than one hour, certain works exceed this time. Because of this there is a requirement for casings which allow several disks to be stored in the same package.

The European patent No. 114631 describes such a casing. This casing comprises two bases, with their disk-holder, identical to that of the single disk cassette described above, which articulate on a new median part. The assembly forms a casing whose thickness is twice that of the single disk cassette. In this casing, each of the bases with its disk-holder can carry one disk and the median part can furthermore carry an additional disk on one or both faces. The casing can therefore contain two to four disks. The two bases, identical to the base described above require no further description. They differ only in their function which, in the casing, becomes a cover instead of a base.

The median part comprises an almost square rectangular plate, and two lateral walls whose height is twice of that of the lateral wall of the cover of the single disk cassette. The lateral walls of the median part extend towards the rear forming flexible arms, provided with two spindles per side. The latter each engage in a hole at the rear of a base and form a pivoting axis for these bases (which have become covers).

The median part is provided with a profiled strip at the front, whose height is less than that of the lateral walls. The edges of this strip form a bearing surface for the butt edges of the covers. At the rear there is also a profiled strip similar to the one at the front.

The rectangular plate of the median part comprises four semicircular openings at the corners, which represent a saving in material and serve for the insertion of fingers for grasping, inserting or extracting the disks. There is a hole at the centre. If the casing is intended to receive three or four disks, a raised support part with segments and hooks is inserted in this hole in order to hold an additional disk on one or both faces. The raised support part, the segments and the hooks are similar to the equivalent parts in the single disk cassette and perform the same functions.

The multi-disk casing of the patent EP 114631 is therefore provided for recordings whose playing time exceeds that of a single compact disk. Practical experience has however shown that in 70% of cases the casing contains only two compact disks. The package limited to two disks in the casing described above results in relatively high costs and volumes with respect to the cost and volume of the offered disks. Furthermore, the thickness of this casing does not allow it to be stored in the conventional storage means provided with compartments having the thickness of single disk cassettes. Finally, its manufacture involves at least five components, namely the two covers, the two disk-holders which are inserted in them and the median part which allows the articulation of the assembly. In production, the manufacture of this casing requires a manufacturing time which is twice that of the single disk cassette.

The European patent application No. 420350 attempted to overcome these disadvantages by proposing a casing for two disks which has the same dimensions as the conventional single disk cassette and which comprises a reduced number of parts and moulds, which represents a significant saving at the manufacturing stage.

This patent application describes a casing constituted from a rectangular median disk-holder provided with a cover for each face. These covers articulate by means of spindles and holes on two diagonally opposite sides of the disk-holder, such that the assembly opens in a zigzag manner.

The median disk-holder part comprises a rectangular plate and two lateral walls. At the front and at the rear, the plate is slightly raised in a staggered manner in order to provide an articulation surface for each cover. The plate between these raised sections comprises semicircular cutouts at the four corners. These cutouts, which can be partially blocked in opposite pairs, allow the disks to be grasped, positioned or extracted. At the centre, on each face, a thicker circular part serves as a support for the area of the disk having no recordings. This part projects segments towards the central hole, these segments which carrying teeth pointing alternately towards one cover or the other. They are intended for fixing or releasing, with a pawl action, the disks which are placed on them or removed from them.

The covers each comprise an upper rectangular wall with two lateral walls. The bottom is folded into C-shape at the rear. The lateral walls each comprise two strips which are curved towards the inside leaving gaps into which can be slipped a title sheet or booklet with an illustrated cover page. The sheet extends rearwards, folds back and thus also indicates the title of the disk on the edge. The same thing is done under the other cover for the disk located there. Thus the casing contains two faces which are printed differently according to the disk which it contains.

The casing of the patent application EP 420 350 does however have the disadvantage that it opens in a zigzag manner with pivoting axes on two opposite faces. This is not very convenient in comparison with the preceding casings which open like a book with pivoting axes on the same side and on the same face. In the case of the patent application EP 420 350 there is a risk of turning the casing in all directions while seeking the appropriate opening for the required disk. Furthermore, when a cover is opened and it is desired to extract the disk by inserting the fingers in the semicircular openings, the pressure of the fingers risks the application of a pressure on the disk on the other face and on its cover causing the disk to fall with the risk of damaging it. Furthermore, this casing cannot be manufactured on conventional single disk cassette production lines nor on conventional assembly machines. The latter must place disks on the median disk-holder part. Now, they are interfered with by the covers which open in zigzag manner and which require machines for vertical assembly. Furthermore, the tenon system of this patent application does not hold the disks sufficiently firmly for the positioning of one disk to prevent the other from falling. Furthermore the disk-holder is not very appropriate for stacking, neither during manufacture nor during assembly. This goes also for the machines for inserting title sheets and booklets, given that two different title sheets are necessary for the two faces in zigzag configuration. Furthermore, these sheets have a type of folding which is different from that of the conventional title sheets of single disk cassettes.

The European patent application No. 430 956 describes a casing for two disks comprising a base, a cover and a disk-holder tray. The base and the cover are similar to those of the single disk cassettes described above. The disk-holder tray comprises a rectangular plate, almost square, and a raised strip having the same function as that of the tray of the conventional single disk cassette. The tray pivots along an axis located along the wall of the base (called front wall), opposite to the one (called rear wall) along which the cover pivots, the tray and the cover pivoting on the same face of the base. The disk-holder tray is provided with a tenon system similar to that described in the patent application EP 420 350.

The casing described in the patent application EP 430 956 does however have numerous disadvantages. The arrangement of the pivoting axis of the disk-holder tray does not allow it to open completely, that is to say through 180°. Because of this, the casing assembly and more particularly the tray, are in a position which is not very stable when it is desired to withdraw or position the disk carried by the lower face of the tray. Another disadvantage of this casing is that the trays cannot be stacked on each other in a stable manner, which prevents automated manufacture and automated assembly of all of the parts of the casing.

The present invention tends to overcome the defects of the known casings. It proposes a storage casing for a data medium in the form of disks with high recording density, known as compact disks, and more particularly for the storage of from one to six disks.

The particular intention is to provide a casing for the storage of one or two disks, this casing having the same outer dimensions as those of conventional single disk cassettes or to provide a casing for the storage of one to six disks, this casing having the same outer dimensions as those of multi-pack casings allowing the storage of one to four disks.

One of the purposes of the invention is in particular to provide a casing which can be manufactured and assembled on the conventional manufacturing lines used for the known single disk cassettes or the known multi-pack casings. It is particularly intended that the manufacture and assembly of the casing according to the invention can be carried out in a completely automated manner. In particular, the disk-holder trays must be stackable on each other in a stable manner, this stacking also having to be possible when the trays carry the disk or disks. This is important throughout the steps of manufacturing and assembling of parts. It is furthermore intended that the stacking of trays can be slightly readjusted in the lateral direction, as in the forward-backward direction, and that this can be done in a completely automated manner. Furthermore, the disk-holder tray, fitted with the disk or disks, must be able to be positioned in the base in an automated manner.

Another purpose of the invention is to provide a casing comprising one or two universal bases able to contain, by choice, one or two trays, these trays being capable of carrying one disk or capable of carrying two compact disks. These trays are interchangeable.

Another purpose of the invention is also to provide a casing for at least one disk, this casing being of high quality but inexpensive, in the sense that it comprises a minimum number of different parts to be moulded.

The purpose of the present invention is also to provide a casing whose tray is provided with a fixing system providing good holding of the disks without the risk, in particular, of one disk falling when the other one is extracted from the fixing system, in the case in which the tray carries two disk. It is also intended to provide a casing whose fixing system or systems are very flexible and therefore supple. This fixing system allows the positioning and withdrawal of the disks in a practical, simple and secure manner.

SUMMARY OF THE INVENTION

The subject of the present invention is therefore a casing for at least one high density data disk constituted by a case and a disk-holder tray, the case being formed from a base and a pivoting device.

The base comprises a rectangular flat bottom, two lateral walls close to the longest sides of the bottom and a front wall and a back wall close to the shortest sides of the bottom.

The disk-holder tray comprises a substantially rectangular plate capable of being disposed in the base of the case. The edges of this plate situated respectively in proximity to the lateral, front and back walls are called lateral, front and back edges. The back edge of the said plate carries a strip which is offset upwards. The said plate comprises, in the centre, on at least one of its two faces, a tenon system matched to the diameter of the central hole of the disk, for holding the latter.

The pivoting device comprises lateral walls of length substantially equal to that of the lateral walls of the base and is capable of being folded back onto the base and the tray, the tray being disposed between the base and the said device.

A recess is formed in the central area of each of the lateral walls of the base and of the pivoting device of the casing according to the invention. The disk-holder tray has lateral protrusions at the places which correspond to these recesses and carries lateral strengthening ribs over at least one face along its lateral edges. The lateral protrusions and the ribs which they carry fit into the recesses when the casing is closed.

Advantageously, the recesses formed in the lateral walls of the base allow strengthening ribs to remain.

According to a first embodiment of the invention, the pivoting device serves as a cover and comprises an upper flat rectangular wall whose front side and rear sides are of length substantially equal to the shortest sides of the rectangular bottom of the base and whose lateral sides are shorter than the longest sides of the rectangular bottom of the base, the said lateral walls extending backwards beyond the rear side of the upper wall and at that place forming, with their free ends, arms for the pivoting mounting of the cover on the base, in proximity to the rear end of the lateral walls of that base. The said upward offset strip is, when the case is closed, disposed substantially in the same plane as the upper wall of the cover.

Advantageously the recesses formed in the lateral walls of the cover allow strengthening ribs to remain.

According to a second embodiment of the casing according to the invention, the latter comprises two bases, two disk-holder trays and one median part. The latter comprises a rectangular plate, whose front side and rear side have a length substantially equal to the shortest sides of the rectangular bottom of the base and whose lateral sides are shorter than the longest sides of the said bottom. The lateral walls of this plate extend on either side of the rectangular plate and extend towards the rear beyond the rear side of the rectangular plate forming there, with their free ends, arms for the pivoting mounting of the two bases. The arms each comprise two spindles capable of being inserted in corresponding holes produced in proximity to the rear end of the lateral walls of the bases, such that each of the two bases is capable of being fitted on either side of the rectangular plate and is capable of articulating through more than 180°. The two pivoting axes are disposed in proximity to the rear ends of the lateral walls of the median part. Two recesses are formed in each of the lateral walls of the median part in the area corresponding to the place where the lateral protrusions of the tray and the ribs carried by the said protrusions fit, when the casing is closed. A strip remains between the recesses of a same lateral wall.

In particular, the median part comprises on one or both sides of the plate a tenon system matched to the diameter of the central hole of the disk and a concentric circular rib for supporting one or two additional disks.

Preferably the disk-holder tray carries a strengthening rib on at least one face along its front edge.

Advantageously, the disk-holder tray carries a strengthening rib on each of its faces along its front edge. The lower rib is, with respect to the upper rib, offset towards the centre of the tray by a distance which substantially corresponds to the thickness of these ribs, such that, when two disk-holder trays are superimposed vertically, the lower rib of the upper tray can pass by the side of the upper rib of the lower tray.

According to a preferred embodiment, the upper strengthening rib carried by the upper face of the disk-holder tray along its front edge, carries protuberances which, when two disk-holder trays are superimposed vertically, serve as stops for the lower rib of the upper tray.

Advantageously, in the lower strengthening rib there is formed at least one notch which, when two disk-holder trays are superimposed, is capable of receiving one of the said protuberances thus preventing a lateral sliding of the two superimposed trays with respect to each other.

According to a preferred embodiment of the invention, the plate of the disk-holder tray carries along its back edge a strengthening rib directed towards the bottom of the base.

Advantageously, the plate of the disk-holder tray has, in proximity to its four corners, cutouts suitable for facilitating the grasping of the disk carried by the disk-holder tray.

According to one embodiment, the tenon system or systems with which the disk-holder tray is provided comprises a ring of teeth capable of being engaged in the central hole of the disk and of clamping against the wall of this hole.

According to another embodiment, the tenon system with which the disk-holder tray is provided comprises a central ring, connected to the tray by spokes. The tenon system also comprises hooks extending from the ring towards the outside of the tray. These hooks have an elastic locking profile.

Preferably, the tenon system is surrounded by a circular concentric rib capable of serving as a support for the disk in its central area which has no data tracks.

According to a particular embodiment of the invention, the disk-holder tray comprises, in the corner formed by the lateral ribs and the plate, fins extending towards the centre of the tray, perpendicular to its lateral edges. These fins comprise a free oblique edge extending from the plate to a horizontal plane passing through the upper free edge of the lateral ribs.

In particular, the lateral strengthening ribs of the tray carry on their upper face, in proximity to the front edge of the tray, a protuberance whose upper free edge is located in the same horizontal plane as the upper free edge of the central lateral ribs.

Advantageously, the tray comprises, in the corner of the said protuberance and of the rectangular plate, a fin extending perpendicular to the lateral edges of the tray, towards the central of the latter. This fin is slightly higher than the protuberance and constitutes a stop preventing the lateral sliding of trays stacked on top of one another.

According to a preferred embodiment of the invention, the disk-holder tray is provided with a tenon system and a concentric circular rib on each of its two faces such that the said tray is capable of carrying two disks.

Advantageously, the disk-holder tray is capable of pivoting about an axis located along one of the walls of the base. The tray then comprises two spindles capable of being inserted in corresponding openings formed in the walls of the base.

It is understood that the reverse is also possible. The spindles may be carried by the walls of the base and inserted in corresponding openings formed in the tray.

In particular, the disk-holder tray is capable of pivoting about an axis located along the front wall of the base. The upper ribs carried by the front edge of the tray carry, at their lateral ends, a laterally directed spindle, capable of being inserted in corresponding openings formed in the lateral walls of the base close to the front wall.

Advantageously, the said openings formed in the lateral walls of the base close to the front wall are formed in a raised section of these walls. The disk-holder tray advantageously comprises a groove along its front edge. Thus, the tray is capable of pivoting through more than 180° about the axis of pivoting located close to the front wall of the base.

In a particular embodiment, two cutouts are produced in the upper rib carried by the front edge of the tray, in proximity to its lateral edges, such that the front edge of the tray has sufficient flexibility that the spindles can be inserted in the corresponding openings of the base.

According to another embodiment of the invention, the disk-holder tray is provided, on its upper face only, with its tenon system and a concentric circular rib, such that the tray is capable of receiving a single disk.

The disk-holder tray then comprises, on its lateral edges, anchoring protuberances directed laterally and capable of being engaged in corresponding openings or notches formed in the lateral walls of the base, such that the tray is capable of being inserted and held in the base.

Advantageously, elongated cutouts are formed along the lateral edges of the disk-holder tray, at the level of the anchoring protuberances, in order to facilitate the insertion of the tray in the base.

In a preferred manner, the disk-holder tray comprises, on its lower face, a support member disposed in the central area of the plate of the tray, in order to prevent the crushing of the tray against the bottom of the base.

BRIEF DESCRIPTION OF THE DRAWINGS

The invention will now be illustrated by preferred embodiments of the casing with reference to the appended drawings in which :

FIG. 1 is a lateral overall view of the open casing according to a first embodiment of the invention with a tray capable of receiving 2 disks;

FIG. 3 is a lateral view of the base;

FIG. 4 is a lateral view of the cover;

FIG. 7 is a cross-section of the disk-holder tray along the line VII—VII of FIG. 5;

FIG. 8 is a lateral view of a cross-section of the closed casing enclosing the disk-holder tray;

FIG. 9 is a partial magnified cross-section of the articulation of the tray on the base, the tray being open by more than 180°;

FIG. 10 is a magnified partial cross-section of the front end of two stacked trays;

FIG. 11 is a magnified partial cross-section along the line XI—XI of FIG. 5 of the centre of the tray showing the tenon system;

FIG. 12 is a front cross-sectional view of the complete closed casing;

FIG. 13 is a view similar to that of FIG. 5 but of another embodiment of the invention in which the tray is intended to receive only one disk;

FIG. 14 is a magnified partial cross-section along the line XIV-XIV of FIG. 13 of the centre of the tray;

FIG. 15 is a view in elevation of the open casing according to a second embodiment of the invention;

DESCRIPTION OF PREFERRED EMBODIMENTS

According to a first embodiment of the invention, shown in FIG. 1 to 14, the casing comprises three main parts : the base 10, the pivoting device called a cover 11, and the disk-holder tray 12. The tray 12 is articulated onto the front of the base 10 and folds towards the inside of the latter, while the cover 11 is articulated onto the rear base 10 and folds onto the tray 12 inserted in the base 10 (see FIG. 1).

Figure 2:
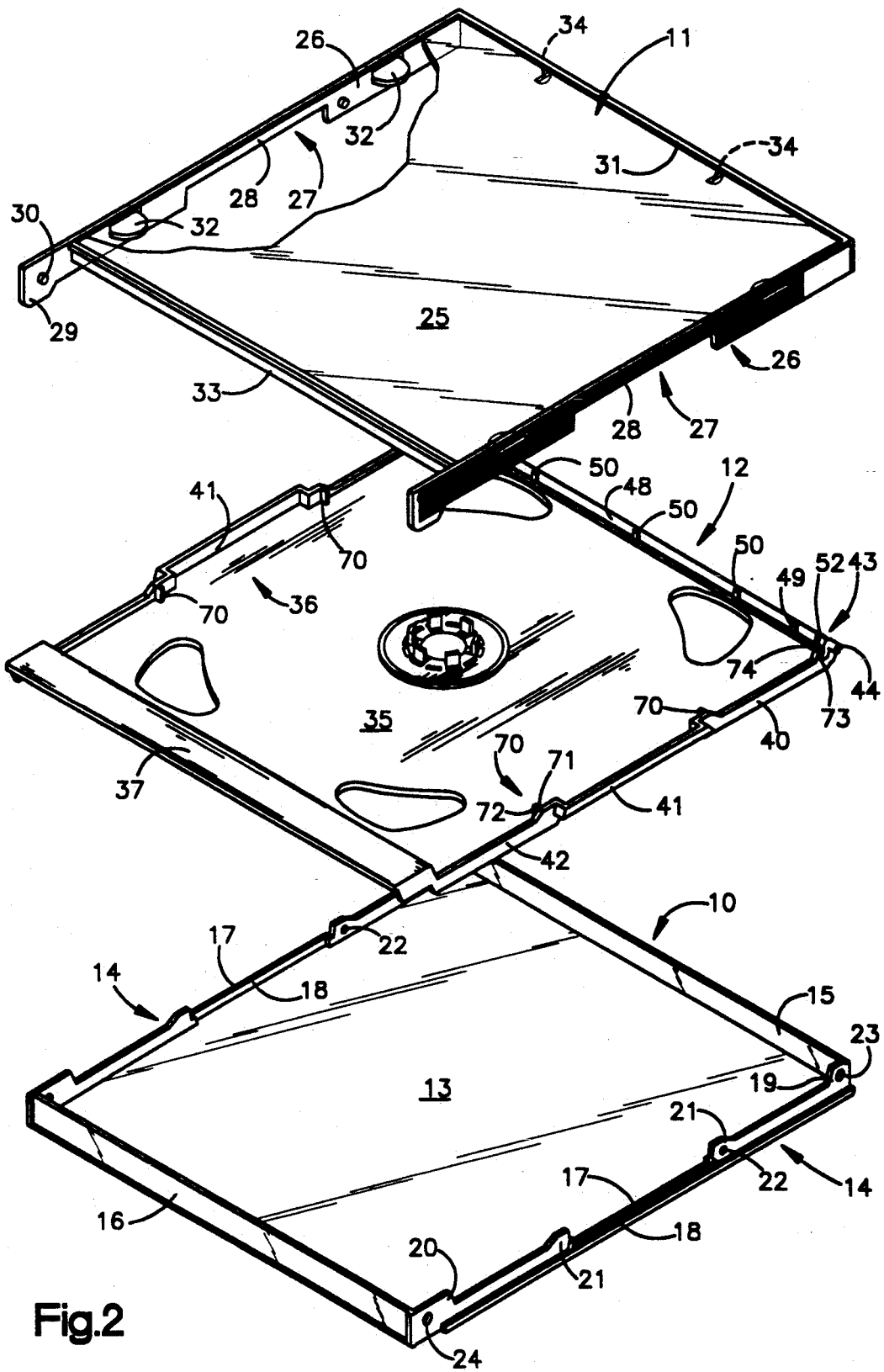
FIG. 2 is an exploded perspective view of three principal parts of the casing shown in FIG. 1.

The base 10, shown in FIG. 2 and 3, comprises a flat rectangular bottom 13 two lateral walls 14, a front wall 15 and a back wall 16. The lateral walls 14 have, in their central area, recesses 17. Along these recesses 17 there is a strengthening rib 18 which is less raised and which overlaps to the exterior of each lateral wall 14. At their front 19 and rear 20 ends and at the side 21 of the recess 17, the lateral walls 14 are raised. The raised sections 21 at the side of the rib 18 are inclined towards the middle for greater stability. The front median raised section 21 comprises an opening 22 with a guidance notch for the insertion of a protuberance of the cover 11 for retaining it folded down on the base 10. The front raised sections 19 comprise articulation opening 23 with a conical guidance notch for the insertion of the spindles of the disk-holder 12 allowing the pivoting of the latter. Furthermore, the rear raised sections 20 can also comprise articulation openings 24 with conical guidance notches for the insertion of the spindles of the cover 11 allowing the pivoting of the latter. On the bottom 13 of the base 10, it is possible to place an illustrated title sheet which is folded back at the front and at the rear to allow the title to appear in small print on the edges 15, 16 of the casing. In order to protect these edges 15, 16 from scratches, they are slightly withdrawn towards the centre of the casing. The front wall 15 is lower than the back wall 16 in order to facilitate the articulation of the tray 12 through at least 180°.

The cover 11, shown in FIG. 2 and 4, comprises an upper flat rectangular wall 25, almost square because its length is shorter than that of the base 10. That is to say that its front and back sides have the same length as the front and back sides of the bottom 13 of the base 10 and its lateral sides are shorter than the lateral sides of the said bottom 13. The cover 11 comprises two lateral walls 26 in the central area of which a recess 27 is formed, a strengthening rib 28 remaining. The lateral walls 26 extend to the rear beyond the upper wall 25 of the cover 11 in order to equalize the length of the lateral walls 14 of the base 10. These extensions form arms 29 which are provided with spindles 30 intended to be inserted in the articulation openings 24 of the rear raised section 20 of the lateral wall 14 of the base 10. In order to be able to close the casing, the lateral walls 14 of the base 10 are slightly withdrawn towards the inside on the bottom 13. Thus, the lateral walls 26 of the cover 11 enclose those 14 of the base 10 and at the same time rest on the small edge of the bottom 13 of the base 10 cleared by the withdrawal of its walls 14. The front edge of the cover 11 comprises a small strip 31 slightly raised in the form of a front wall. This small front wall 31 of the cover 11 rests on the upper edge of the front wall 15 of the base 10. The cover 11 comprises tabs 32 extending towards the interior parallel to the bottom 13 and which leave a certain clearance in which it is possible to slip a booklet with an illustrated cover page. This booklet is stopped at the rear by a strip 33 of the same thickness in the form of a rear wall. At the front it is stopped by small conical protuberances 34.

The disk-holder tray 12, shown in FIG. 2, 5, 6, and 7, comprises a rectangular plate 35. The latter comprises a back edge, a front edge and two lateral edges. The lateral edges have a lateral protrusion 36 in the median area. In the closed position of the casing, these protrusions 36 are inserted in the recesses 17, 27 of the lateral walls 14, 26 of the base 10 and of the cover 11. The rear of the plate 35 comprises a strip which is offset upwards 37 which, in the closed position of the casing, rests on the upper edge of the back wall 16 of the base 10. The position of this strip 37 clears the articulation 24–30 of the cover 11. In order to prevent the collapsing of this strip 37 when several trays 12 are stacked, this collapsing being due for example to pressure by the fingers in the middle, this strip 37 comprises, in the middle of the downward facing face 10, a foot 38 and possibly additional vertical struts. The strip 37 also comprises two small horizontal struts 39 to prevent the collapse of the rear edge of the cover 11, when the casing is closed.

The disk-holder tray 12 comprises vertical strengthening ribs 40, 41, 42. The front 40 and the rear 42 ribs extend towards the base 10 (in the closed position) while the rib 41 points towards the cover 11 and follows the edge of the lateral protrusion 36 of the plate 35. This arrangement of the strengthening ribs 40, 41, 42 represents a considerable strengthening of the complete tray 12, giving it its own sufficient rigidity and resistance to flexion. This allows the manufacture of the plate 35 and the tray 12 from a thinner sheet. For example, this sheet can have a thickness of 1.2 mm in comparison with the plates of the prior art which would have a thickness of 1.5 mm, which represents a saving in material of about 20%. Furthermore, the saving in thickness frees space for enclosing two disks.

The front edge of the tray 12 is also strengthened, in particular by a rib 47 (lower) directed towards a base 10 and by rib 48 (upper) directed towards the cover 11. The lower rib 47 is, with respect to the upper rib 48, offset towards the centre of the tray by a distance which substantially corresponds to the thickness of these ribs 47, 48 such that, during stacking, the lower rib 47 of the tray 12 above passes to the side of the upper rib of the tray 12 below.

The upper rib 48 carries small vertical protuberances 49, 50 disposed towards the centre of the tray 12, serving as stops for the lower rib 47 of the tray 12 stacked above (see FIG. 10). The two protuberances 49 located towards the lateral ends of the tray 12 have the same height as that of the rib 48, while the other protuberances 50 are of lesser height. The lower rib 47 comprises, close to each lateral end, a notch 51 capable of receiving, when two trays 12 are superimposed, the protuberances 49 of the upper rib 48 of the tray 12 below. This notch 51-protuberance 49 arrangement prevents the lateral sliding of superimposed trays.

The upper front rib 48 has, at its lateral ends, small widenings 43, whose upper edge is rounded. These widenings 43 carry mushroom-shaped spindles 44 intended to be inserted in the openings 23 of the raised section 19 of the lateral wall 14 of the base 10. The spindle 44-opening 23 assembly thus forms a pivoting axis for the tray 12, allowing it to be inserted in the base 10 or to pivot through more than 180°.

In order to facilitate this pivoting through more than 180°, a groove 45 is produced along the front edge of the plate 35 such that the tray 12 can pass above the front wall 15 of the base 10 during its pivoting (see FIG. 9).

At the lower front end of the front lateral rib 40 a rounded notch 46 is produced. This notch is capable of receiving, when two trays 12 are superimposed, the upper rounded end of the widening 43 of the rib 48 of a tray 12 below (see FIG. 10).

In the upper front rib 48, in proximity to its lateral ends, are formed two notches 52 (which can be seen in FIG. 5, 6 and 12) allowing a slight folding of the front edge of the tray 12 in order to be able to insert the spindles 44 in the corresponding openings 23 of the base 10. These notches 52 can also be extended in the plate 35 of the tray 12.

Furthermore, the back edge of the tray 12 is strengthened by a vertical rib 69 (FIG. 7). The assembly of strengthening ribs of the edges of the tray 12 provide it with good resistance to flexion.

Figure 5:
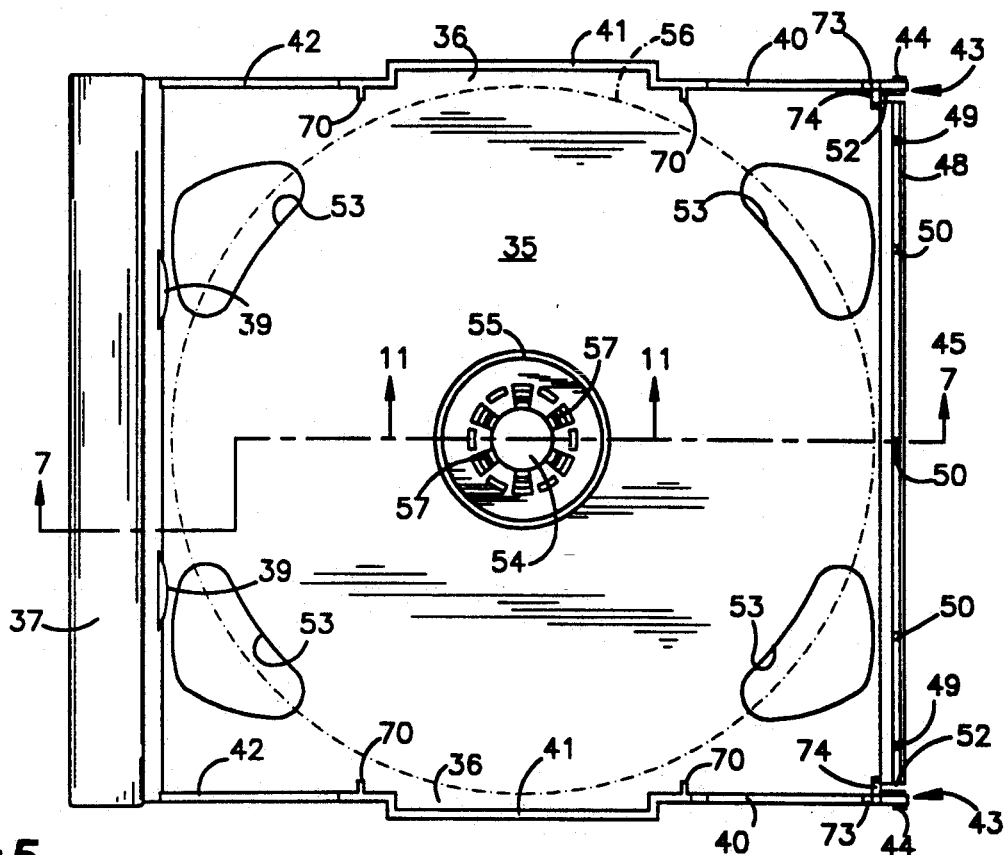
FIG. 5 is a plan view of the tray capable of carrying two disks, seen from above.
Figure 6:
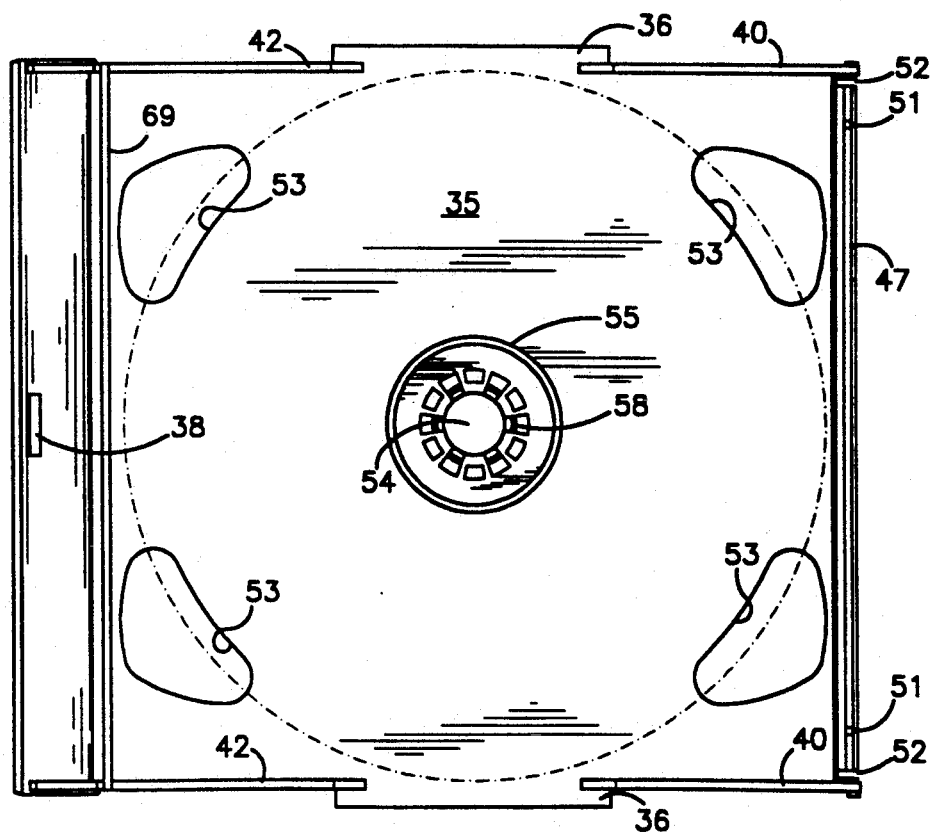
FIG. 6 is a plan view of the same disk-holder tray seen from below.

In FIG. 2 and 5 there can be seen fins 70 disposed in the corner formed by the plate 35 and the lateral ribs 41 carried by the central section of the lateral edges of the tray 12. These fins 70 extend towards the centre of the tray 12, perpendicular to these lateral edges. They comprise a free horizontal edge 71 located in the same plane as the free upper edge of the central lateral ribs 41 and an oblique free edge 72 extending from the free horizontal edge 71 to the plate 35 of the tray 12.

The purpose of these fins 70 is to facilitate the repositioning of two trays 12 when stacked with a lateral offset. In effect, a simple lateral pressure on the laterally offset tray 12, allows the lower edge of the lateral ribs 40, 42 of the tray 12 above to move along the oblique slope 72 of the fins 70 of the tray 12 below and to reposition themselves correctly on the upper edge of the central lateral ribs 41 of the tray 12 below. Without these fins 70, the lateral ribs 40, 42 of the tray 12 above would abut against the lateral ribs 41 of the tray 12 below.

In FIG. 5, 7 and 10, it can seen that the lateral front ribs 40 carry a protuberance 73 on their upper face, in proximity to the front edge of the tray 12. The upper edge of this protuberance 73 is located in the same horizontal plane as the upper edge of the central lateral rib 41.

In the corner formed by this protuberance 73 and the plate 35, a fin 74 extends towards the centre of the tray 12 perpendicular to these lateral edges. This fin 74 is formed in a similar way to that of the fins 70 but its upper edge is located slightly higher than the upper edge of the protuberance 73. The fin 74 therefore constitutes a small lateral stop for the front lateral rib 40 of the tray 12 above and prevents the lateral sliding of trays 12 stacked one above the other.

The arrangement of front strengthening ribs 47, 48, the insertion of the upper section of the widenings 43 in the corresponding notch 46, the insertion of the protuberances 49 in the corresponding notches 51, the fins 70 and the stop formed by the fin 74 allow the easy and stable stacking of disk-holder trays 12. This is very important throughout the manufacture and assembly of the parts. In effect, the manufacturing machines manufacture the cases (base 10 and cover 11) and assemble them on the one hand and, on the other hand, manufacture the disk-holder trays 12 separately. The latter are stacked and sent to the manufacturers of compact disks. There, machines insert the disks onto the trays, transfer the trays fitted with their disks to assembly lines where these trays and the title sheets and booklets are automatically fitted into the cases. During all of the journeys or transfers between machines and handling locations, it is important that the disks are inserted and protected by the trays in order to avoid any deterioration of these disks. The importance of stable stacking is due to this. In order to even further enhance this, it is possible to provide the lower front rib 47 with three cross-shaped excrescences and, during stacking, to pass a finger through the central hole of the trays 12.

Other arrangements could also ensure a stable stacking, without departing from the context of the invention.

At the four corners of the bottom 35 of the tray 12 are produced grasping cutouts 53 to allow the insertion of fingers for grasping the disks, which also represents a saving of material.

It should be noted that the shape of the grasping cutouts 53 is of little importance, provided that they allow the passage of a finger.

At the centre, the tray 12 comprises a hole 54 and, concentric with the latter, each face comprises at least one circular rib 55 which serves as a raised support surface for the non-recorded section of the disk 56, which allows the recorded section to float freely without any friction with the package.

Pawl teeth 57, 58 stand around the central hole 54 disposed in a concentric circle. Alternatively, half of them 57 stand substantially perpendicular to the face facing the cover 11 and the other half 58 stand on the face facing the base 10 (see FIG. 11).

Each series of teeth 57, 58 is intended to hold a disk 56 with a pawl action. The configuration of the teeth 57, 58 of the invention allows the disk 56 to be held in place better without risk of detachment on the one hand and, on the other hand, allows them to be released when grasping with the fingers in the cutouts 53.

In order to release the disk 56, it is grasped through the grasping cutouts 53. In order to improve the pawl type engagement and release action, the upper edge of the teeth 57, 58, is rounded, then it comprises a downward inclined and narrowing slope. The rounded upper edge facilitates the pawl type engagement action and the slope facilitates the release.

According to a variant of the invention each face comprises, between the teeth 57, 58 described above, perfectly vertical teeth, at 90°, of the same height, which support the pawl teeth 57, 58 of the disk-holder trays 12 above and below during stacking, which prevents the collapse of the trays 12 at their centres.

Another variant embodiment of the system for holding disks will be explained later.

According to a second embodiment of the tray 63 according to the invention, shown in FIG. 13 and 14, the tray is capable of carrying only a single disk. In this instance, the disk-holder tray 63 comprises one pair of anchoring protuberances 64 per side, which are inserted in corresponding openings or notches of the base 10. In effect, in this variant, the tray 63 is inserted and locked in the base 10 and no longer articulates forward from the latter. The lateral spindles 44, the groove 45 and the notches 52 are eliminated.

Four elongated cutouts 65 are formed along the lateral edges of the tray 63, at the level of the anchoring protuberances 64 in order to allow a slight compression of the tray 63 and thus to allow it to be inserted in the corresponding openings or notches of the base 10.

At the centre, the tray 63 comprises a circular support rib 55 for the disk 56 and a tenon system only on the face facing the cover 11. The other face carries a circular strip 67 (having the height of the absent teeth). This support strip 67 prevents the collapse of the centre when pressing on it on the one hand and, on the other hand, holds the centre of the title sheet in position without it forming a curve.

The casing according to this embodiment of the invention has the advantage of having the same outside dimensions as conventional single disk cassettes and that it can be manufactured on the same manufacturing lines and on the same assembly lines. It comprises the same devices for illustrated title sheets and booklets with an illustrated cover page. It has the additional advantage in its preferred version of allowing the storage of two disks at the same time with the dimensions of the single disk, which allows these casings to be stored in all the existing cassette storage systems with single disk thickness compartments.

Figure 16:
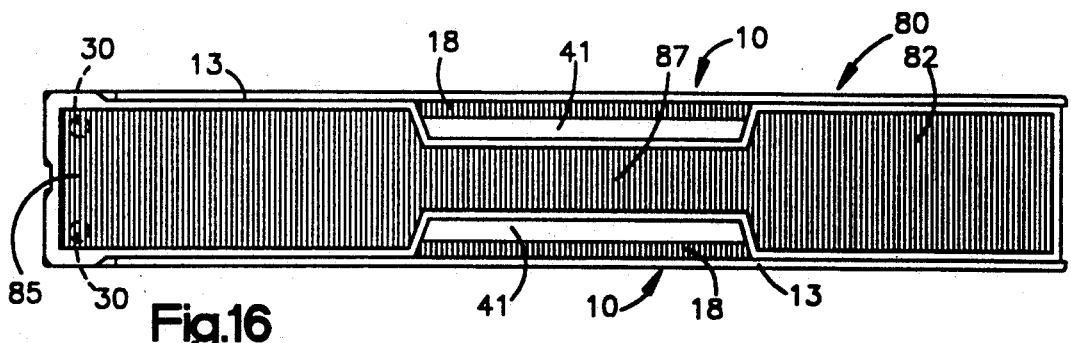
FIG. 16 is a lateral view of the same closed casing.
Figure 17:
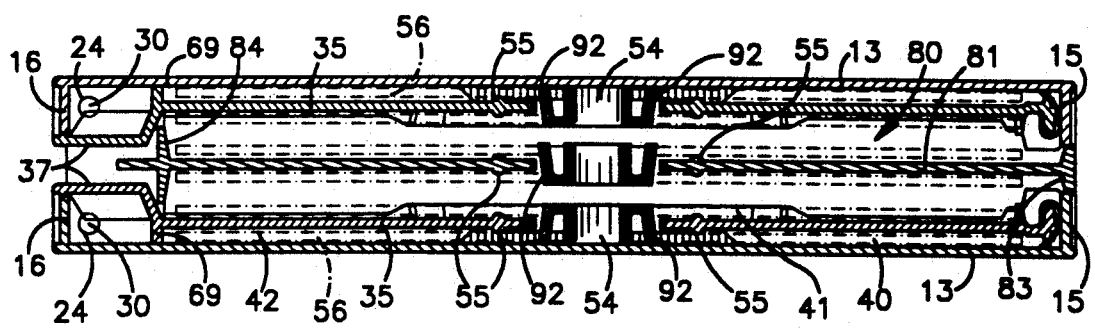
FIG. 17 is a lateral cross-sectional view of the casing as shown in FIG. 16.

According to a second embodiment of the invention, shown in FIG. 15 to 17, the casing comprises five parts : two bases 10 identical to those described for the first embodiment, two disk-holder trays 12, 63 which can be capable of carrying one or two disks 56 and a median part 80 allowing the articulation of the whole assembly.

The median part 80, comprises a rectangular plate 81, two lateral walls 82, a front wall 83 and back wall 84.

The front and back sides of the rectangular plate 81 have the same length as the front and back sides of the bottom 13 of the base 10 and the lateral sides of the plate 81 are shorter than those of the bottom 13 of the base 10.

The two lateral walls 82 of the median part 80 extend on either side of the plate 81 and have a height which is double the height of the lateral walls 26 of the cover 11. These walls 82 extend to the rear beyond the rectangular plate 81 in order to equalize the length of the lateral walls 14 of the base 10. These extensions form arms 85 and are each provided with two spindles 30 intended to engage in the articulation openings 24 of the raised rear 20 of the lateral wall 14 of two bases 10. The median part 80 therefore comprises two pivoting axes in proximity to its rear section, for two bases 10. These bases 10 are capable of fitting into opposite sides of the rectangular plate 81 and of pivoting through more than 180°.

When the casing is closed, the lateral walls 82 of the median part 80 enclose the lateral walls 14 of the two bases 10 and fit onto the small edges of the bottoms 13 of the bases 10, freed by the withdrawal towards the centre of the lateral walls 14 of the bases 10.

Two rectangular recesses 86 are formed in the central area of each lateral wall 82 of the median part 80, a strip 87 remaining between the two recesses 86. When the casing is closed, a lateral protrusion 36 of a tray 12, 63 and a strengthening rib 18 of a base 10 fit into each recess 86 of the median part 80.

The front wall 83 of the median 80 is inserted, when the casing is closed, between the upper edge of the front wall 15 of the two bases 10.

This casing therefore allows one or two disks 56 to be contained per tray 12, 63, and can also include an additional disk 56 on each of the two faces of the median part 80. In order to do this, a central part (not shown) with a circular rib or ribs and a tenon system or systems must be fixed at the centre of the plate 81 of the median part 80.

The plate 81 of the median part 80 comprises, at the four corners, semicircular cutouts 88 which represent a saving of material and allow the insertion of fingers for grasping the disk 56 and for handling the median part 80.

The casing according to this embodiment of the invention has the advantage of having the same outer dimensions as conventional casings provided for the storage of one to four disks (EP 114, 631) and furthermore allows the storage of 1 to 6 disks. It can be manufactured on the same manufacturing and assembly lines as those provided for the conventional casings. It comprises the same illustrated title sheets and can also contain two booklets of thickness 2.5 mm in addition to the six compact disks.

Figure 18:
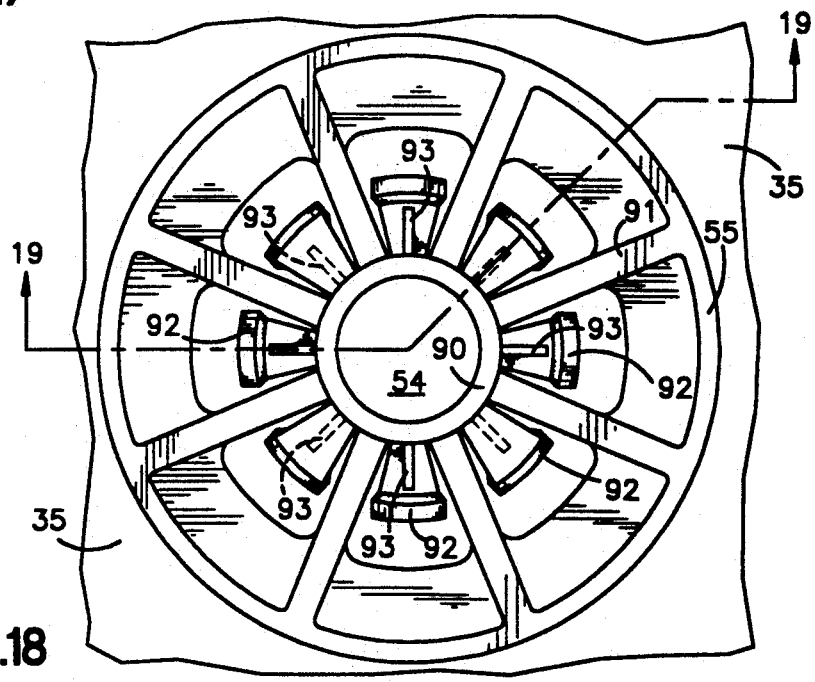
FIG. 18 is a magnified plan view of a variant embodiment of the tenon system.
Figure 19:
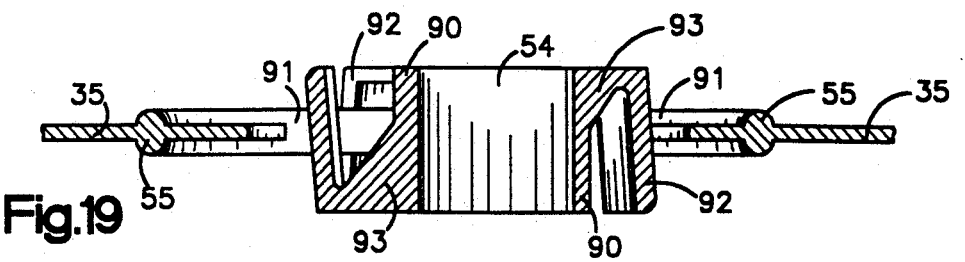
FIG. 19 is a cross-section along the line XIX—XIX of FIG. 18.

In FIG. 18 and 19 there can be seen a variant of the disk holding system. For convenience, this system is shown here with the casing according to the second embodiment of the invention (casing for 1 to 6 disks) but it could just as well be appropriate for the first embodiment (casing for 1 or 2 disks), and vice-versa. The disk holding system is independent of the other characteristics of the invention.

According to this variant, the tray 12, 63 comprises a central hole 54 in which is disposed a ring 90. The upper free edges of the ring 90 is located in the same plane as the upper free edge of the lateral ribs 41 and its lower free edge is located is located in the same plane as the lower free edge of the lateral ribs 40 and 42. This ring 90 is connected to the plate 35 of the tray 12 by spokes 91.

Between each spoke 91, a hook 92 extends from the ring towards the outside of the hole 54 and stands vertically at an angle slightly greater than 90°. In the corner formed by the ring 90 and each hook 92 stands a small triangular buttress 93. The hooks of the prior art, on the contrary, protrude from the outside, extend towards the inside of the central hole of the tray and stand at an angle of less than 90°. This configuration did not allow an easy release of the disk held because tension on the disk has the effect of increasing the locking force of the tenon system. In contrast, with the configuration of the tenon system according to the invention, a slight tension on the disk has the effect of bending the hook 92 slightly towards the inside and of releasing the disk. The great flexibility of the hooks 92 allows easy release of the disks.

The pawl action holding of the disk is facilitated by the rounded shape of the outer side of the upper edge of the hooks 92 and also by their extreme flexibility. After pawl type engagement, the hooks 92 resume their slightly oblique position, which ensures the firm holding of the disks throughout the duration of handling the trays 12, 63.

This configuration of the tenon system also has the advantage of having a central hole, useful during the stacking of the trays on top of each other for the passage of a centring finger.

Another advantage of this configuration is that it has a greater horizontal flat surface in the plane passing through the upper and lower free edges of the tenon system. This allows a more stable and easier stacking of the trays on top of each other without any hooking of teeth between two trays.

What is claimed is:

1. A closable casing capable of storing at least one disk having a high recording density and a central hole, the casing comprising:

a base (10) including a rectangular flat bottom (13) having a pair of long sides and a pair of short sides, the base including two lateral walls (14) in proximity to the long sides of the bottom, a front wall (15) in proximity to one of the short sides of the bottom, and a back wall (16) in proximity to the other one of the short sides of the bottom;

a disk-holder tray (12, 63) capable of carrying at least one disk, the tray including a substantially rectangular plate (35) disposable in the base, the plate having lateral, front, and back sides located, respectively, in proximity to the lateral, front, and back walls of the base, the plate having opposite major surfaces lying in parallel planes, the plate including a central portion located between the opposite major faces and a strip portion (37) spaced apart from the central portion and extending along a plane spaced apart from the parallel planes of the opposite major faces;

a tenon system located on at least one of the opposite major faces of the plate and disposable in the central hole of a disk for holding the disk; and a pivoting device including lateral walls (26, 82) having lengths substantially equal to that of the lateral walls (14) of the base, each of the lateral walls (14, 26, 82) of the base and of the pivoting device having a corresponding central area in which a recess (17, 27, 86) is formed, the pivoting device including pivoting means for enabling the pivoting device to be folded back onto the base;

the tray (12, 63) being disposed between the base and the pivoting device, the tray carrying lateral strengthening ribs (40, 41, 42) over at least one face along its lateral sides for reinforcing the tray, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed.

2. A casing according to claim 1 wherein the lateral walls (14) of the base (10) include strengthening ribs (18), the recesses (17) formed in the lateral walls (14) of the base (10) allowing the strengthening ribs (18) of the lateral walls of the base to remain.

3. A casing according to claim 1 wherein the pivoting device acts as a cover (11) and includes an upper flat rectangular wall (25) having front and rear walls which are of length substantially equal to the short sides of the rectangular bottom (13) of the base (10) and having the lateral walls (26) which are shorter than the long sides of the rectangular bottom (13) of the base (10), the lateral walls (26) of the upper wall (25) extending rearwards beyond the rear wall of the upper wall (25) to form the pivoting means for enabling the pivoting device to be folded back onto the base, the pivoting means including forming arms (29) which pivotably mount the cover (11) on the base (10), each of the lateral walls (14) of the base (10) having a rear edge, the arms (29) being in proximity to the rear edges of the lateral walls (14) of the base (10), the strip portion (37) being, when the casing is closed, disposed substantially in the same plane as the upper wall (25) of the cover (11).

4. A casing according to claim 3 wherein the lateral walls (26) of the cover (11) form recesses (27) and include strengthening ribs (28), the recesses (27) formed in the lateral walls (26) of the cover (11) allowing the strengthening ribs (28) of the lateral walls (26) of the cover (11) to remain.

5. A casing according to claim 1 wherein the plate (35) of the disk-holder tray (12, 63) includes along its back side a strengthening rib (69) directed towards the bottom (13) of the base (10).

6. A casing according to claim 1 wherein the plate (35) of the disk-holder tray (12, 63) has four corners and cutouts (53) in proximity to its four corners suitable for facilitating the grasping of a disk (56) carried by the disk-holder tray (12, 63).

7. A casing according to claim 1 wherein the tenon system comprises a ring of teeth (57, 58) capable of being engaged in the central hole of a disk (56) and of being clamped against the disk in the central hole.

8. A casing according to claim 1 wherein the disk-holder tray (12) includes a circular concentric rib (55) surrounding the tenon system and capable of serving as a support for a disk (56) in its central area which has no data tracks.

9. A casing according to claim 1 wherein the disk-holder tray (12) includes a concentric circular rib (55) on each of its two opposite major faces, the tenon system and the concentric circular ribs (55) cooperating such that the tray (12) is capable of carrying two disks (56), the lateral walls (14) of the base (10) forming openings (23), the disk-holder tray (12) being pivotable about an axis located along the front wall (15) of the base (10), the tray (12) comprising two laterally-directed spindles (44) capable of being inserted in the openings (23) formed in the lateral walls of the base (10), the tray (12) including an upper rib (48) along the front side of the plate (35), the upper rib (48) having lateral ends (43) and carrying the laterally-directed spindles (44) at the lateral ends (43), the spindles (44) being inserted in the openings (23) formed in the lateral walls (14) of the base (10) close to the front wall (15) of the base to enable the tray (12) to pivot about the axis located along the front wall (15) of the base (10).

10. A casing according to claim 1 where in the disk-holder tray (63) includes a concentric circular rib (55), the tenon system and the circular rib (55) being disposed on only one of the opposite major faces of the plate (35) and cooperating such that the tray (63) is capable of receiving a single disk (56).

11. A casing according to claim 10 wherein the lateral walls (14) of the base (10) form openings or notches, the disk-holder tray (63) including anchoring protuberances (64) located along the lateral sides of the plate (35), the anchoring protuberances (64) being directed laterally and being engagable in the openings or notches formed int he lateral walls (14) of the base (10) such that the tray (63) is capable of being inserted and held in the base (10).

12. A casing according to claim 11 wherein elongated cutouts (65) are formed along the lateral sides of the plate (35) of the disk-holder tray (63), the cutouts being in the vicinity of the anchoring protuberances (64) and cooperating with the anchoring protuberances (64) to facilitate the insertion of the tray (63) in the base (10).

13. A casing according to claim 10 wherein the disk-holder tray (63) includes a support member (67) disposed in the central portion of the plate (35) of the tray (63) for preventing the crushing of the tray (63) against the bottom (13) of the base (10).

14. A closable casing for storing at least one disk having a high recording density and a central hole, the casing comprising:
a first base (10) including a rectangular flat bottom (13) having a pair of long sides and a pair of short sides, the first base including two lateral walls (14) in proximity to the long sides of the bottom, a front wall (15) in proximity to one of the short sides of the bottom, and a back wall (16) in proximity to the other one of the short sides of the bottom;
a first disk-holder tray (12, 63) including a substantially rectangular plate (35) disposable in the first base, the plate having lateral, front, and back sides located, respectively, in proximity to the lateral, front, and back walls of the first base, the plate having opposite major surfaces lying a in parallel planes, the plate including a central portion located between the opposite major faces and a strip portion (37) spaced apart from the central portion and extending along a plane spaced apart from the parallel planes of the opposite major faces;
a first tenon system located on at least one of the opposite major faces of the plate and disposable in the central hole of a first disk for holding the first disk; and
a pivoting device including lateral walls (26, 82) having lengths substantially equal to that of the lateral walls (14) of the first base, each of the lateral walls (14, 26, 82) of the first base and of the pivoting device having a corresponding central are in which a recess (17, 27, 86) is formed, the pivoting device including first pivoting means for enabling the pivoting device to be folded back onto the first base;
the first tray (12, 63) being disposed between the first base and the pivoting device, the first tray carrying lateral strengthening ribs (40, 41, 42) over at least one face along its lateral sides, the lateral strengthening ribs of the first tray defining lateral protrusions (36) located at places which correspond to places at which the recesses (17, 27, 86) of the lateral walls (14, 26, 82) of the first base and of the pivoting device are located, each lateral protrusion fitting into a recess in a lateral wall of the first base and into a recess in a lateral wall of the pivoting device when the casing is closed;

the pivoting device comprising a second base substantially identical to the first base, a second diskholder tray substantially identical to the first diskholder tray, and a median part (80) to which the first and second bases are pivotably mounted, the median part including (i) the first pivoting means for enabling the pivoting device to be folded back onto the first base and (ii) a second pivoting means for enabling the median part to be folded back onto the second base, the median part including a rectangular plate (81) and lateral walls (82) extending on opposite sides of the rectangular plate (81), the rectangular plate (82) including front and rear sides having lengths substantially equal to the short sides of the rectangular bottom (13) of the first base (10) and lateral sides having lengths shorter than the long sides of the rectangular bottom (13), each lateral wall of the median part (80) forming two recesses (86) and including a strip (87) located between the two recesses (86) in the same lateral wall of the median part, one of the two recesses formed in the lateral wall of the median part corresponding to a recess which receives a lateral protrusion of the first tray when the casing is closed, the other one of the two recesses formed in the lateral wall of the median part corresponding to a recess which receives a lateral protrusion of the second tray, the lateral walls (82) of the median part (80) extending rearwards beyond the rear side of the rectangular plate (81) to form the first and second pivoting means, each of the first and second pivoting means including arms (85) which pivotably mount the median part (80) on the first and second bases, each lateral wall of the first and second bases having a rear edge, the arms (85) including spindles (30) capable of being inserted in corresponding holes (24) formed in proximity to the rear edges of the lateral walls (14) of the first and second bases (10) such that each of the first and second bases (10) is capable of being fitted on either opposite major face of the rectangular plate (81) and is capable of articulating through more than 180°.

15. A casing according to claim 14 wherein the median part (80) includes a concentric circular rib (55) for supporting a second disk, and further comprising a second tenon system located on at least one of the opposite major faces of the plate (81) and disposable in the central hole of a second disk.

16. A closable casing for storing at least one disk having a high recording density and a central hole, the casing comprising:

a base (10) including a rectangular flat bottom (13) having a pair of long sides and a pair of short sides, the base including two lateral walls (14) in proximity to the long sides of the bottom, a front wall (15) in proximity to one of the short sides of the bottom, and a back wall (16) in proximity to the other one of the short sides of the bottom;

a disk-holder tray (12, 63) including a substantially rectangular plate (35) disposable in the base, the plate having lateral, front, and back sides located, respectively, in proximity to the lateral, front, and back walls of the base, the plate having opposite major surfaces lying in parallel planes, the plate including a central portion located between the opposite major faces and a strip portion (37) spaced apart from the central portion and extending along a plane spaced apart from the parallel planes of the opposite major faces;

a tenon system located on at least one of the opposite major faces of the plate and disposable in the central hole of a disk for holding the disk; and a pivoting device including lateral walls (26, 82) having a lengths substantially equal to that of the lateral walls (14) of the base, each of the lateral walls (14, 26, 82) of the base and of the pivoting device having a corresponding central area in which a recess (17, 27, 86) is formed, the pivoting device including pivoting means for enabling the pivoting device to be folded back onto the base;

the tray (12, 63) being disposed between the base and the pivoting device, the tray carrying lateral strengthening ribs (40, 41, 42) over at least one face along its lateral sides, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed;

the disk-holder tray (12, 63) carrying along its front side a lower strengthening rib (47) on one of its opposite major faces and an upper strengthening rib (48) on the other one of its opposite major faces, the lower strengthening rib (47) being, with respect to the upper strengthening rib (48), offset towards the center of the tray (12, 63) by a distance which substantially corresponds to the thickness of the lower and upper ribs (47, 48) such that, when an upper disk-holder tray (12, 63) is superimposed vertically on a lower disk-holder tray, the lower rib (47) of the upper tray (12, 63) can pass by the side of the upper rib (48) of the lower tray (12, 63).

17. A casing according to claim 16 wherein the upper strengthening rib (48) carried by the front side of the lower disk-holder tray (12, 63) carries protuberances (49, 50) which, when two disk-holder trays (12, 63) are superimposed vertically, serve as stops for the lower rib (47) of the upper tray (12, 63).

18. A casing according to claim 17 wherein at least one notch (51) is formed in the lower strengthening rib (47), the notch (51) being capable of receiving one (49) of the protuberances (49, 50) when two disk-holder trays are superimposed to thereby prevent lateral sliding of the two superimposed trays (12, 63) with respect to each other.

19. A closable casing for storing at least one disk having a high recording density and a central hole, the casing comprising:

a base (10) including a rectangular flat bottom (13) having a pair of long sides and a pair of short sides, the base including two lateral walls (14) in proximity to the long sides of the bottom, a front wall (15) in proximity to one of the short sides of the bottom, and a back wall (16) in proximity to the other one of the short sides of the bottom;

a disk-holder tray (12, 63) including a substantially rectangular plate (35) disposable in the base, the plate having lateral, front, and back sides located, respectively, in proximity to the lateral, front, and back walls of the base, the plate having opposite major surfaces lying in parallel planes, the plate including a central portion located between the opposite major faces and a strip portion (37) spaced apart from the central portion and extending along a plane spaced apart from the parallel planes of the opposite major faces;

a tenon system located on at least one of the opposite major faces of the plate and disposable in the central hole of a disk for holding the disk; and a pivoting device including lateral walls (26, 82) having lengths substantially equal to that of the lateral walls (14) of the base, each of the lateral walls (14, 26, 82) of the base and of the pivoting device having a corresponding central are in which a recess (17, 27, 86) is formed, the pivoting device including a pivoting means for enabling the pivoting device to be folded back onto the base;

the tray (12, 63) being disposed between the base and the pivoting device, the tray carrying lateral strengthening ribs (40, 41, 42) over at least one face along its lateral sides, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed;

the tenon system of the disk-holder tray (12, 63) including a central ring (90) connected to the tray (12, 63) by spokes (91), the tenon system including elastic hooks (92) extending radially from the ring (90).

20. A closable casing for storing at least one disk having a high recording density and a central hole, the casing comprising:

a base (10) including a rectangular flat bottom (13) having a pair of long sides and a pair of short sides, the base including two lateral walls (14) in proximity to the long sides of the bottom, a front wall (15) in proximity to one of the short sides of the bottom, and a back wall (16) in proximity to the other one of the short sides of the bottom;

a disk-holder tray (12, 63) including a substantially rectangular plate (35) disposable in the base, the plate having lateral, front, and back sides located, respectively, in proximity to the lateral, front, and back walls of the base, the plate having opposite major surfaces lying in parallel planes, the plate including a central portion located between the opposite major faces and a strip portion (37) spaced apart from the central portion and extending along a plane spaced apart from the parallel planes of the opposite major faces;

a tenon system located on at least one of the opposite major faces of the plate and disposable in the central hole of a disk for holding the disk; and a pivoting device including lateral walls (26, 82) having lengths substantially equal to that of the lateral walls (14) of the base, each of the lateral walls (14, 26, 82) of the base and of the pivoting device having a corresponding central area in which a recess (17, 27, 86) is formed, the pivoting device including pivoting means for enabling the pivoting device to be folded back onto the base;

the tray (12, 63) being disposed between the base and the pivoting device, the tray carrying lateral strengthening ribs (40, 41, 42) over at least one face along its lateral sides, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed;

the disk-holder tray (12, 63) comprising, in a corner formed by the lateral strengthening ribs (40, 41) and the plate (35), fins (70) extending towards the center of the tray (12, 63) and perpendicular to its lateral sides, each of the fins (70) comprising a free oblique edge (72) extending from the plate (35) to a horizontal plane passing through an upper free edge of the lateral strengthening ribs (41).

21. A closable casing for storing at least one disk having a high recording density and central hole, the casing comprising:

a base (10) including a rectangular flat bottom (13) having a pair of long sides a pair of short sides, the base including two lateral walls (14) in proximity to the long sides of the bottom, a front wall (15) in proximity to one of the short sides of the bottom, and a back wall (16) in proximity to the other one of the short sides of the bottom;

a disk-holder tray (12, 63) including a substantially rectangular plate (35) disposable in the base, the plate having lateral, front, and back sides located, respectively, in proximity to the lateral, front, and back walls of the base, the plate having opposite major surfaces lying in parallel planes, the plate including a central portion located between the opposite major faces and a strip portion (37) spaced apart from the central portion and extending along a plane spaced apart from the parallel planes of the opposite major faces;

a tenon system located on at least one of the opposite major faces of the plate and disposable in the central hole of a disk for holding the disk; and a pivoting device including lateral walls (26, 82) having lengths substantially equal to that of the lateral walls (14) of the base, each of the lateral walls (14, 26, 82) of the base and of the pivoting device having a corresponding central area in which a recess (17, 27, 86) is formed, the pivoting device including pivoting means for enabling the pivoting device to be folded back onto the base;

the tray (12, 63) being disposed between the base and the pivoting device, the tray carrying lateral strengthening ribs (40, 41, 42) over at least one face along its lateral sides, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed;

a forward one of the lateral strengthening ribs (40) of the tray (12, 63) carrying on an upper face, in proximity to the front side of the tray (12, 63), a protuberance (73) having an upper free edge located in the same horizontal plane as an upper free edge of a central one of the lateral strengthening ribs (41).

22. A casing according to claim 21 wherein the tray (12, 63) comprises, in a corner of the protuberance (73) and of the rectangular plate (35), a fin (74) extending perpendicular to the lateral sides of the tray (12, 63) towards the central portion of the tray, the fin (74) being slightly higher than the protuberance (73) so as to constitute a stop preventing the lateral sliding of trays (12, 63) stacked on top of one another.

23. A closable casing for storing more than one disk having a high recording density and a central hole, the casing comprising:

- a base (10) including a rectangular flat bottom (13) having a pair of long sides and a pair of short sides, the base including two lateral walls (14) in proximity to the long sides of the bottom, a front wall (15) in proximity to one of the short sides of the bottom, and a back wall (16) in proximity to the other one of the short sides of the bottom;
- a disk-holder tray (12) including a substantially rectangular plate (35) disposable in the base, the plate having lateral, front, and back sides located, respectively, in proximity to the lateral, front, and back walls of the base, the plate having opposite major surfaces lying in parallel planes, the plate including a central portion located between the opposite major faces and a strip portion (37) spaced apart from the central portion and extending along a plane spaced apart from the parallel planes of the opposite major faces;
- a tenon system located on at least one of the opposite major faces of the plate and disposable in the central hole of a disk for holding the disk; and
- a pivoting device including lateral walls (26, 82) having lengths substantially equal to that of the lateral walls (14) of the base, each of the lateral walls (14, 26, 82) of the base and of the pivoting device having a corresponding central area in which a recess (17, 27, 86) is formed, the pivoting device including pivoting means for enabling the pivoting device to be folded back into the base;
- the tray (12) being disposed between the base and the pivoting device, the tray carrying lateral strengthening ribs (40, 41, 42) over at least one face along its lateral sides, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed;
- the disk-holder tray (12) including a concentric circular rib (55) on each of its two opposite major faces, the tenon system and the concentric circular ribs (55) cooperating so that the tray (12) is capable of carrying two disks (56),
- the disk-holder tray (12) being capable of pivoting about an axis located along the front wall of the base (10), the tray including an upper rib (48) carried by the front side of the tray (12), the tray having lateral ends (43) and carrying laterally-directed spindles (44) at its lateral ends (43), the spindles (44) capable of being inserted in corresponding openings (23) formed in the lateral walls (14) of the base (10) close to the front wall (15);
- the openings (23) formed in the lateral walls (14) of the base (10) being formed in a raised section (19) of the lateral walls (14) of the base (10), the disk-holder tray (12) comprising a groove (45) along its front side such that the tray (12) is capable of pivoting through more than 180° about the axis of pivoting.

24. A casing according to claim 23 wherein two cutouts (52) are formed in the upper rib (48) carried by the front side of the tray (12) in proximity to the lateral sides of the tray, such that the front side of the tray (12) has sufficient flexibility that the spindles (440) can be inserted in the corresponding openings (23) of the base (10).

25. A closable casing capable of storing more than one disk having a high recording density and a central hole, the casing comprising:

- a base (10) including a rectangular flat bottom (13) having a pair of long sides and a pair of short sides, the base including two lateral walls (14) in proximity to the long sides of the bottom, a front wall (15) in proximity to one of the short sides of the bottom, and a back wall (16) in proximity to the other one of the short sides of the bottom;
- a disk-holder tray (12) capable of carrying more than one disk, the tray including a substantially rectangular plate (35) disposable in the base, the plate having lateral, front, and back sides located, respectively, in proximity to the lateral, front, and back walls of the base, the plate having opposite major surfaces lying in parallel planes, the plate including a central portion located between the opposite major faces and a strip portion (37) spaced apart from the central portion and extending along a plane spaced apart from the parallel planes of the opposite major faces;
- a tenon system located on at least one of the opposite major faces of the plate and disposable in the central hole of a disk for holding the disk; and
- a pivoting device including lateral walls (26, 82) having lengths substantially equal to that of the lateral walls (14) of the base, each of the lateral walls (14, 26, 82) of the base and of the pivoting device having a corresponding central area in which a recess (17, 27, 86) is formed, the pivoting device including pivoting means for enabling the pivoting device to be folded back onto the base;
- the tray (12) being disposed between the base and the pivoting device, the tray carrying lateral strengthening ribs (40, 41, 42) over at least one face along its lateral sides for reinforcing the tray, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed;
- the pivoting device acting as a cover (11) and including an upper flat rectangular wall (25) having front and rear walls which are of length substantially equal to the short sides of the rectangular bottom (13) of the base (10) and having the lateral walls (26) which are shorter than the long sides of the rectangular bottom (13) of the base (10), the laterals walls (26) of the upper wall (25) extending rearwards beyond the rear wall of the upper wall (25) to form the pivoting means for enabling the pivoting device to be folded back onto the base, the pivoting means including forming arms (29) which pivotably mount the cover (11) on the base (10), each of the lateral walls (14) of the base (10) having a rear edge, the arms (29) being in proximity to the rear edges of the lateral walls (14) of the base (10), the strip portion (37) being, when the casing is closed, disposed substantially in the same plane as the upper wall (25) of the cover (11);

the disk-holder tray (12) including a concentric circular rib (55) on each of its two opposite major faces, the tenon system and the concentric circular ribs (55) cooperating such that the tray (12) is capable of carrying two disks (56), the lateral walls (14) of the base (10) forming openings (23), the disk-holder tray (12) being pivotable about an axis located along the front wall (15) of the base (10), the tray(12) comprising two laterally-directed spindles (44) capable of being inserted in the openings (23) formed in the lateral walls of the base (10), the tray (12) including an upper rib (48) along the front side of the plate (35), the upper rib (48) having lateral ends (43) and carrying the laterally-directed spindles (44) at the lateral ends (43), the spindles (44) being inserted in the openings (23) formed in the lateral walls (14) of the base (10) close to the front wall (15) of the base to enable the tray (12) to pivot about the axis located along the front wall (15) of the base (10).

26. A closable casing capable of storing more than one disk having a high recording density and a central hole, the casing comprising:

a base (10) including a rectangular flat bottom (13) having a pair of long sides an da pair of short sides, the base including two lateral walls (14) in proximity to the long sides of the bottom, a front wall (15) in proximity to one of the short sides of the bottom, and a back wall (16) in proximity to the other one of the short sides of the bottom;

a disk-holder tray (12) capable of carrying more than one disk, the tray including a substantially rectangular plate (35) disposable in the base, the plate having lateral, front, and back sides located, respectively, in proximity to the lateral, front, and back walls of he base, the plate having opposite major surfaces lying ion parallel planes, the plate including a central portion located between the opposite major faces and a strip portion (37) spaced apart from the central portion and extending along a plane spaced apart from the parallel planes of the opposite major faces;

a tenon system located on at least one of the opposite major faces of the plate and disposable in the central hole of a disk for holding the disk; and a pivoting device including lateral walls (26, 82) having lengths substantially equal to that of the lateral walls (14) of the base, each of the lateral walls (14, 26, 82) of the base and of the pivoting device having a corresponding central area in which a recess (17, 27, 86) is formed, the pivoting device including pivoting means for enabling the pivoting device to be folded back onto the base;

the tray (12) being disposed between the base and the pivoting device, the tray carrying lateral strengthening ribs (40, 41, 42) over at least one face along its lateral sides for reinforcing the tray, the lateral strengthening ribs of the tray defining lateral protrusions (36) located at places which correspond to places at which the recesses (17, 27, 86) of the lateral walls (14, 26, 82) of the base and of the pivoting device are located, each lateral protrusion fitting into a recess in a lateral wall of the base and into a recess in a lateral wall of the pivoting device when the casing is closed;

the pivoting device acting as a cover (11) and including an upper flat rectangular wall (25) having front and rear walls which are of length substantially equal to the short sides of the rectangular bottom (13) of the base (10) and having the lateral walls (26) which are shorter than the long sides of the rectangular bottom (13) of the base (10), the lateral walls (26) of the upper wall (25) extending rearwards beyond the rear wall of the upper wall (25) to form the pivoting means for enabling the pivoting device to be folded back onto the base, the pivoting means including forming arms (29) which pivotably mount the cover (11) on the base (10), each of the lateral walls (14) of the base (10) having a rear edge, the arms (29) being in proximity to the rear edges of the lateral walls (14) of the base (10), the strip portion (37) being, when the casing is closed, disposed substantially in the same plane as the upper wall (25) of the cover (11);

the disk-holder tray (12) including a concentric circular rib (55) on each of its two opposite major faces, the tenon system and the concentric circular ribs (55) cooperating such that the tray (12) is capable of carrying two disks (56), the lateral walls (14) of the base (10) forming openings (23), the disk-holder tray (12) being pivotable about an axis located along the front wall (15) of the base (10), the tray (12) comprising two laterally-directed spindles (44) capable of being inserted in the openings (23) formed in the lateral walls of the base (10), the tray (12) including an upper rib (48) along the front side of the plate (35), the upper rib (48) having lateral ends (43) and carrying the laterally-directed spindles (44) at the lateral ends (43), the spindles (44) being inserted in the openings (23) formed in the lateral walls (14) of the base (10) close to the front wall (15) of the base to enable the tray (12) to pivot about the axis located along the front wall (15) of the base (10);

the tenon system comprising a first set of pawl teeth for holding a disk adjacent to one major face of the plate (35) and a second set of pawl teeth for holding another disk adjacent to the other major face of the plate (35), the first and second set of pawl teeth extending alternately around the circumference of a central opening in the central portion of the plate (35), the first set of pawl teeth projecting substantially perpendicular to the one major face of the plate and the second set of pawl teeth projecting substantially perpendicular to the other major face of the plate, the one major face of the plate facing the base (10) and the other major face of the plate facing the pivoting device when the casing is closed.

* * * * *

UNITED STATES PATENT AND TRADEMARK OFFICE
CERTIFICATE OF CORRECTION

PATENT NO. : 5,244,085
DATED : September 14, 1993
INVENTOR(S) : Henri Lammerant and Filip Lammerant It is certified that error appears in the above-indentified patent and that said Letters Patent is hereby corrected as shown below:

Column 16, line 15, change "int he" to --in the--.

Column 16, line 44, after "lying" delete --a--.

Column 16, line 58, change "are" to --area--.

Column 17, line 19, change "(82)" to --(81)--.

Column 18, line 12, after "ing" delete --a--.

Column 19, line 17, change "are" to --area--.

Column 22, line 68, change "laterals" to -lateral--.

Column 23, line 38, change "an da" to --and a--.

Column 23, line 49, change "he" to --the--.

Column 23, line 51, change "ion" to --in--.

Signed and Sealed this

Fifth Day of April, 1994

Attest:

BRUCE LEHMAN

Attesting Officer          Commissioner of Patents and Trademarks